United States Patent
Tominaga

(10) Patent No.: US 8,816,833 B2
(45) Date of Patent: Aug. 26, 2014

(54) DISPLAY DEVICE FOR VEHICLE

(75) Inventor: Hiroshi Tominaga, Okazaki (JP)

(73) Assignee: Denso Corporation, Kariya (JP)

( * ) Notice: Subject to any disclaimer, the term of this patent is extended or adjusted under 35 U.S.C. 154(b) by 589 days.

(21) Appl. No.: 12/536,722

(22) Filed: Aug. 6, 2009

(65) Prior Publication Data

US 2010/0033311 A1 Feb. 11, 2010

(30) Foreign Application Priority Data

Aug. 6, 2008 (JP) ................................. 2008-203409
Mar. 11, 2009 (JP) .................................. 2009-58563

(51) Int. Cl.
- *B60Q 1/00* (2006.01)
- *G09G 3/36* (2006.01)
- *G01D 11/28* (2006.01)

(52) U.S. Cl.
USPC .......... 340/425.5; 340/438; 340/461; 345/87; 116/287

(58) Field of Classification Search
USPC ...................................... 340/425.5
See application file for complete search history.

(56) References Cited

U.S. PATENT DOCUMENTS

| | | | |
|---|---|---|---|
| 6,120,159 A | 9/2000 | Inoguchi et al. | |
| 6,224,222 B1 | 5/2001 | Inoguchi et al. | |
| 6,621,471 B1 | 9/2003 | Ozaki et al. | |
| 2001/0024361 A1* | 9/2001 | Suzuki et al. | 362/23 |
| 2004/0027041 A1 | 2/2004 | Nishikawa | |
| 2005/0066275 A1* | 3/2005 | Gannon | 715/700 |
| 2006/0290486 A1* | 12/2006 | Sumiya et al. | 340/461 |
| 2007/0132572 A1* | 6/2007 | Itoh et al. | 340/462 |
| 2007/0247404 A1* | 10/2007 | Yoshimura | 345/87 |
| 2008/0123322 A1* | 5/2008 | Tane et al. | 362/23 |
| 2008/0252579 A1* | 10/2008 | Kato et al. | 345/87 |
| 2009/0112389 A1* | 4/2009 | Yamamoto et al. | 701/29 |
| 2009/0174682 A1* | 7/2009 | Bowden et al. | 345/173 |

FOREIGN PATENT DOCUMENTS

| | | |
|---|---|---|
| JP | 62-058110 | 3/1987 |
| JP | 63-232048 | 9/1988 |
| JP | 10-091087 | 4/1998 |
| JP | 11-334413 | 12/1999 |
| JP | 2001-083913 | 3/2001 |
| JP | 2004-070193 | 3/2004 |
| JP | 2004-136823 | 5/2004 |
| JP | 2004-284508 | 10/2004 |

(Continued)

OTHER PUBLICATIONS

Japanese Office Action dated Jun. 29, 2010, issued in corresponding Japanese Application No. 2009-058563, with English translation.

*Primary Examiner* — George Bugg
*Assistant Examiner* — Jack K Wang
(74) *Attorney, Agent, or Firm* — Nixon & Vanderhye P.C.

(57) ABSTRACT

A display device for a vehicle includes a meter unit, an indicator unit and a control unit. The meter unit includes an image display monitor having a screen, and a meter for indicating a value of a vehicle first state is displayed by an image on the screen. The indicator unit includes a display pane defining an opening for exposing the meter at a display side of the image display monitor, an indicator is provided on the display pane at a peripheral area of the opening, and the indicator displays a vehicle second state by light. The control unit controls independently a display luminance of the meter and a display luminance of the indicator.

7 Claims, 12 Drawing Sheets

(56) References Cited

FOREIGN PATENT DOCUMENTS

| JP | 2004-327069 | 11/2004 |
| JP | 2005-041355 | 2/2005 |
| JP | 2006-021574 | 1/2006 |
| JP | 2006-153750 | 6/2006 |
| JP | 2006-267557 | 10/2006 |
| JP | 2008-158497 | 7/2008 |

* cited by examiner

DISPLAY DEVICE FOR VEHICLE

CROSS REFERENCE TO RELATED APPLICATION

The present application is based on Japanese Patent Applications No. 2008-203409 filed on Aug. 6, 2008, and No. 2009-058563 filed on Mar. 11, 2009, the disclosures of which are incorporated herein by reference.

FIELD OF THE INVENTION

The present invention relates to a display device for a vehicle.

BACKGROUND OF THE INVENTION

A display device for a vehicle that displays both a meter for indicating a value of a vehicle state and an indicator for indicating vehicle condition such as abnormal condition and operation condition of the vehicle is widely used. For example, JP-A-2008-111829, corresponding to US 2008/123322, discloses a display device for a vehicle that displays by an image both a meter and an indicator on a screen of an image display monitor.

As one example of a display device for a vehicle that displays by an image on a screen of an image display monitor, a device that can vary display luminance on the screen is generally known. For example, JP-A-2004-284508 discloses a display device for a vehicle that can obtain an anti-glare property by changing display luminance of a meter to be displayed by an image on the screen of the image display monitor in accordance with an adjustment value based on illuminance of outside light.

In the case where the display luminance on the screen of the image display monitor can be varied in the display device of JP-A-2008-111829 as shown in JP-A-2004-284508, the anti-glare property of the meter can be obtained by decreasing the display luminance. Thereby, the indication of the value of the vehicle state as the function of the meter can be accomplished. In contrast, because the indicator for indicating the vehicle condition is displayed smaller than the meter for indicating the value of the vehicle state, visibility may be deteriorated by decreasing the display luminance on the screen and the indication of the vehicle condition as the function of the indicator may be impaired.

SUMMARY OF THE INVENTION

In view of the above points, it is an object of the present invention to provide a display device for a vehicle that can achieve both the function of the meter and the function of the indicator.

According to one aspect of the present invention, a display device for a vehicle includes a meter unit including an image display monitor having a screen, a meter for indicating a value of a vehicle first state displayed by an image on the screen; an indicator unit including a display pane defining an opening for exposing the meter at a display side of the image display monitor, and an indicator being provided on the display pane at a peripheral area of the opening, wherein the indicator is configured to display a vehicle second state by light; and a control unit configured to control independently a display luminance of the meter and a display luminance of the indicator.

In the above configuration, the meter is displayed by an image on the screen configured by the image display monitor of the meter unit, in contrast, the indicator provided on the display pane of the indicator unit is displayed by light. By independently and separately controlling the display luminance of the meter and the display luminance of the indicator, which are units separated from each other, with the use of the control unit, the anti-glare property can be obtained in the meter and the visibility can be secured in the indicator. Furthermore, the indicator is formed around the opening, through which the meter is exposed at the display side of the image display monitor. Thereby, a visual distance between the indicator and the driver becomes shorter than a visual distance between the meter and the driver, and the visibility of the indicator can be improved because of perspective. Therefore, the display device can accomplish both indicating the value of the vehicle state by the meter, which is achieved by the anti-glare property, and indicating the vehicle condition by the indicator, which is achieved by securing the visibility.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
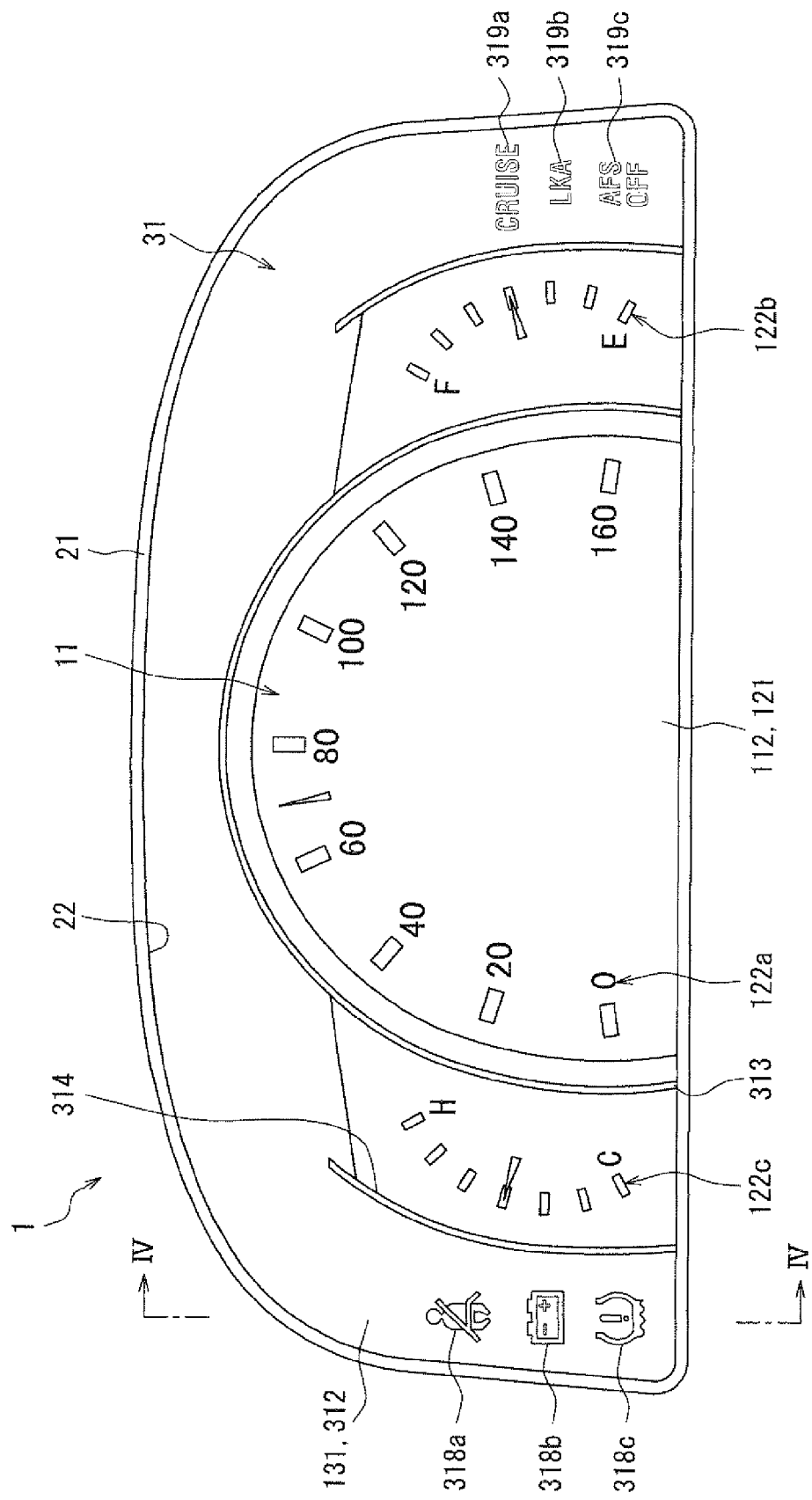
FIG. 1 is a front view showing a schematic configuration of a display device for a vehicle according to a first embodiment of the present invention.

Hereinafter, embodiments of the present invention will be described with reference to the drawings. In the respective embodiments, with respect to the corresponding portion to one described in a precedent embodiment, the same reference numeral is indicated and the redundant description will be skipped.

First Embodiment

Figure 2:
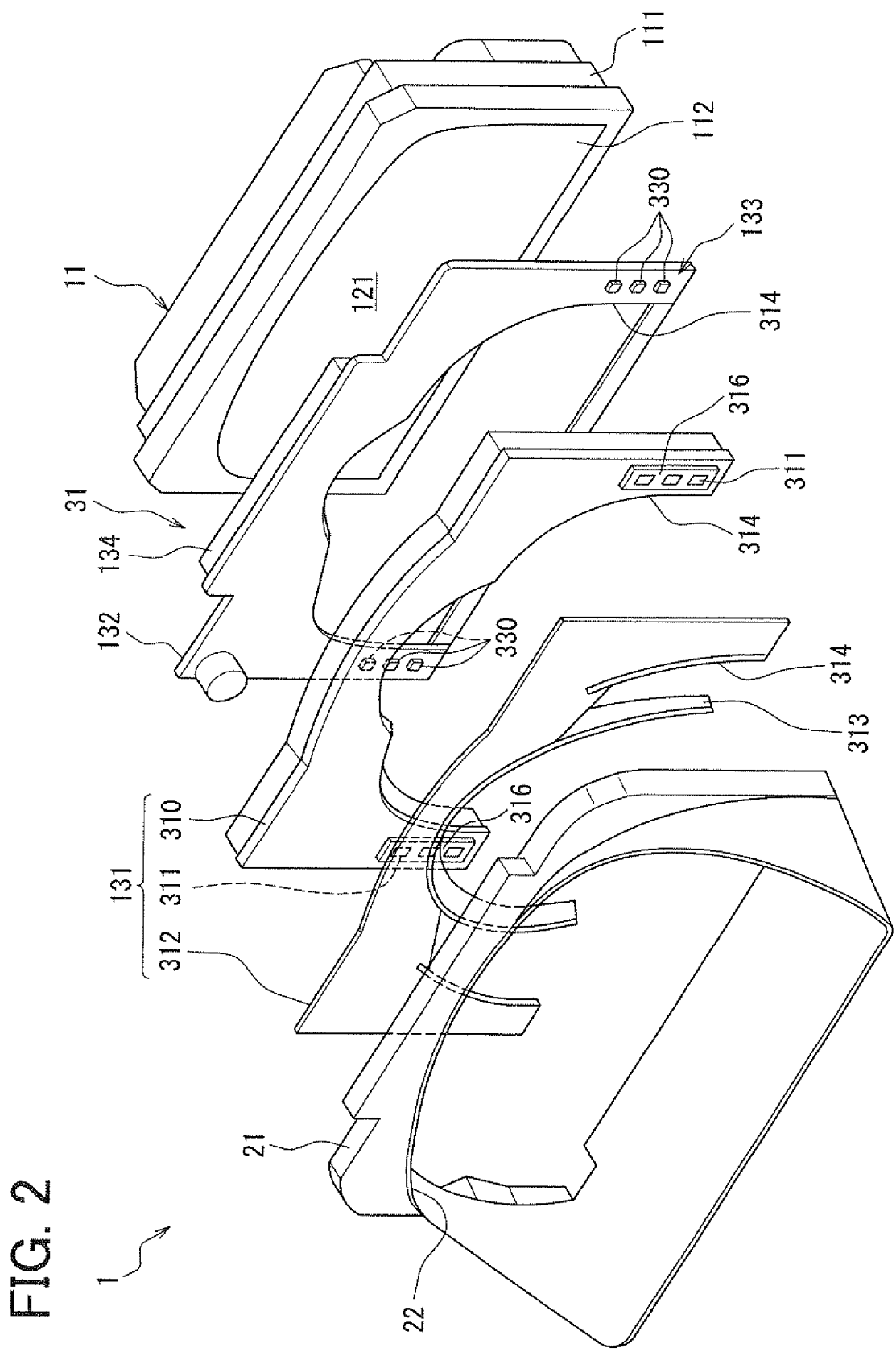
FIG. 2 is an exploded perspective view showing the schematic configuration of the display device for a vehicle according to the first embodiment of the present invention.
Figure 3:
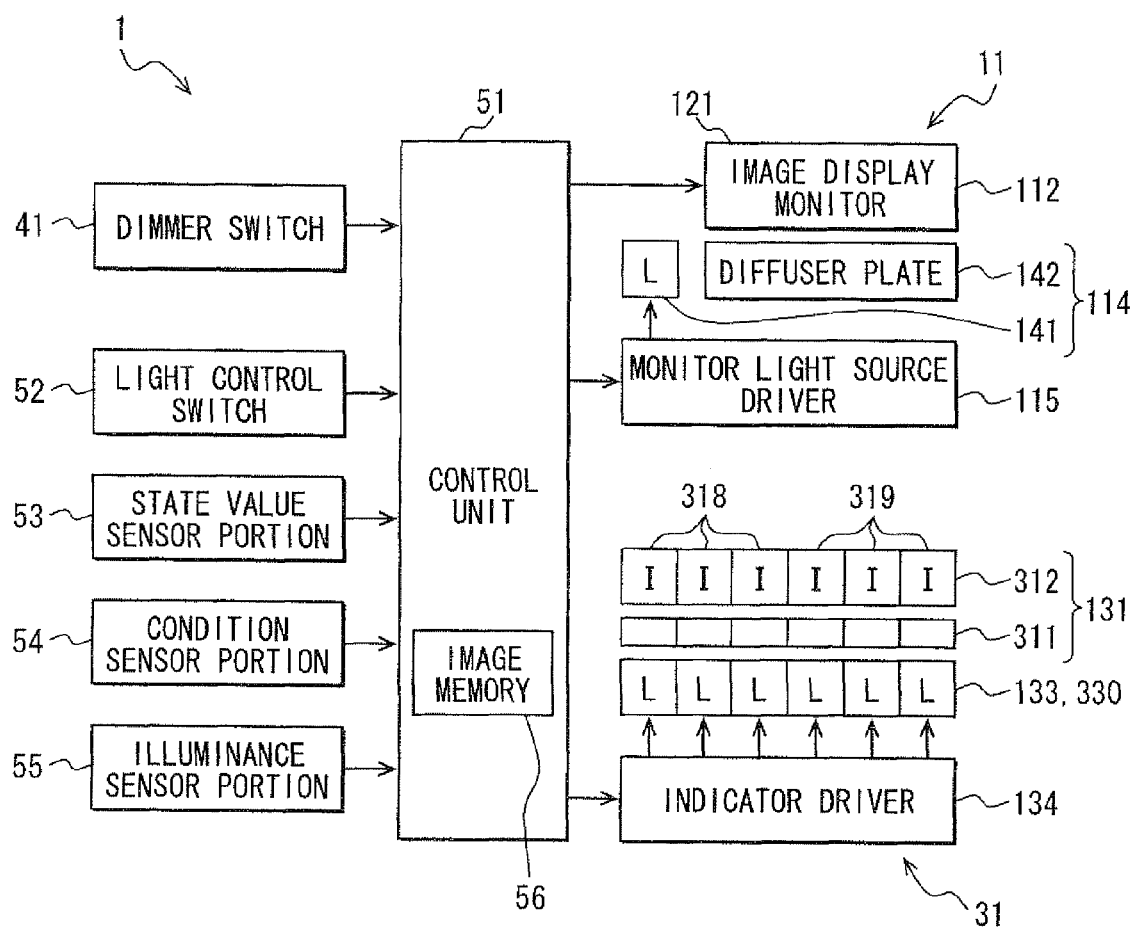
FIG. 3 is a block diagram showing a configuration of an electric circuit of the display device for a vehicle according to the first embodiment of the present invention.

A display device 1 for a vehicle according to a first embodiment of the present invention functions as a combination meter as shown in FIG. 1 to FIG. 3. The display device 1 includes a meter unit 11, a facing plate 21, an indicator unit 31, a dimmer switch 41 and a control unit 51.

Figure 4:
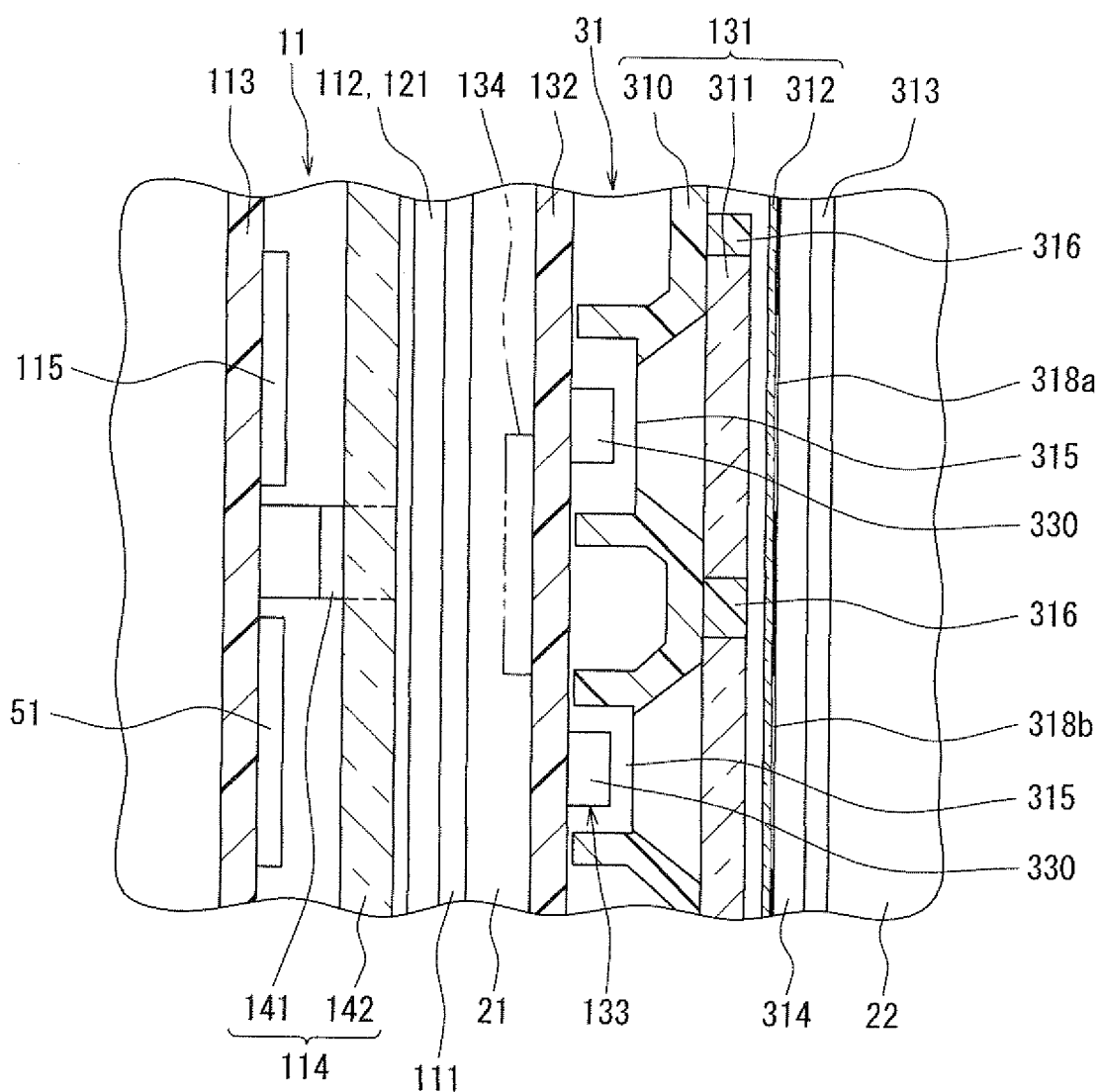
FIG. 4 is a cross-sectional view taken along line IV-IV in FIG. 1.

A configuration of the display device 1 will be described. As shown in FIG. 2 and FIG. 4, the meter unit 11 is configured by a monitor chassis 111, an image display monitor 112, a monitor substrate 113, a monitor light source 114, a monitor light source driver 115 and the like.

The monitor chassis 111 is made of metal and is configured to be a frame structure that is an approximately rectangular shape when seen from an anterior view. The monitor chassis 111 is attached to an instrument panel located in front of a driver seat of the vehicle.

The image display monitor 112 is held in the monitor chassis 111 such that a screen 121 of the image display monitor 112 faces toward the driver seat of the vehicle. The image display monitor 112 is a dot-matrix type TFT transmissive liquid-crystal display monitor having the screen 121, in which plural liquid-crystal pixels are arranged in a matrix state. The liquid-crystal pixels are driven so that a full-color image display is realized. The respective liquid-crystal pixels of the screen 121 in the present embodiment is configured by three-color sub-pixels R, G, B, to which a red color filter, a green color filter and a blue color filter are provided respectively. A monitor control signal for setting a value of a gray level of the sub-pixels is input into the image display monitor 112 so that the respective liquid-crystal pixels are driven.

As shown in FIG. 1, the image display monitor 112 displays by an image plural meters 122 for indicating the value of the vehicle state on the screen 121 by driving the respective liquid-crystal pixels in the screen 121 except a top edge portion and right and left edge portions of the screen 121. The vehicle state is a state that is displayed by the meters 122, and the vehicle state is also referred to as "a vehicle first state". The meters 122 of the present embodiment include a speed meter 122a that indicates a vehicle speed, a fuel meter 122b that indicates a remaining fuel level and a temperature meter 122c that indicates a temperature of a coolant. Specifically, the speed meter 122a is always displayed on an approximately center portion of the screen 121 in an upward convex arch-like fashion as a whole. The fuel meter 122b is always displayed at the right of the speed meter 122a of the screen 121 in a rightward convex arch-like fashion as a whole. The temperature meter 122c is always displayed at the left of the speed meter 122a of the screen 121 in a leftward convex arch-like fashion as a whole.

In order to display by an image the respective meters 122 in the present embodiment, the monitor control signal is generated such that the value of the gray level of sub-pixels having a concentration necessary for the image display in the sub-pixels of the respective liquid-crystal pixels is set to higher than 0 and the value of the gray level of the other sub-pixels is set to 0. Hereinafter, the value of the gray level of the sub-pixels having the concentration necessary for the image display in the sub-pixels of the liquid-crystal pixels for displaying the respective meters 122 is referred to as "the value of the gray level of pixels in the respective meters 122".

The monitor substrate 113 shown in FIG. 4 is a hard substrate made of glass epoxy or the like. The monitor substrate 113 is held in the monitor chassis 111 behind the screen 121 of the image display monitor 112.

The monitor light source 114 includes a light emitting diode 141 and a diffuser plate 142. The light emitting diode 141 is a chip-type light emitting diode and is mounted on the monitor substrate 113. The light emitting diode 141 is driven by energization to emit light so that white light is emitted. The diffuser plate 142 is made of a light transmissive resin such as polycarbonate resin and is configured to be a flat-plate shape. The diffuser plate 142 is held in the monitor chassis 111 behind the screen 121 of the image display monitor 112. The diffuser plate 142 diffuses incident light from the adjacent light emitting diode 141 toward the screen 121 of the image display monitor 112 so that the screen 121 is lighted by light-transmission toward a display side and the respective meters 122 of the screen 121 emit light.

The monitor light source driver 115 is mainly configured by an electric circuit. The monitor light source driver 115 is mounted on the monitor substrate 113 and is electrically connected to the light emitting diode 141 of the monitor light source 114 as shown in FIG. 3. The monitor light source driver 115 drives the light emitting diode 141 by energization in accordance with a light source control signal so that luminance of the light emitting diode 141 is adjusted.

As shown in FIG. 1, FIG. 2 and FIG. 4, the facing plate 21 is made of a light reflective resin such as polypropylene and is configured to be a frame structure that is an approximately rectangular shape when seen from an anterior view. The facing plate 21 is attached to the meter unit 11. A window portion 22 is formed by an inner surface of the facing plate 21.

The indicator unit 31 is configured by a display pane 131, an indicator substrate 132, an indicator light source 133 and an indicator driver 134 and the like. The display pane 131 includes a main frame 310, a diffuser plate 311 and a display panel 312, and is held in the facing plate 21 at the display side of the image display monitor 112.

As shown in FIG. 2, the main frame 310 is made of a light reflective resin such as polypropylene and is configured to be a frame structure that is an approximately inverted U-shape when seen from an anterior view. The main frame 310 defines an opening 314 in the window portion 22 of the facing plate 21. Thereby, the respective meters 122 of the screen 121 are exposed through the opening 314 at the display side of the image display monitor 112 as shown in FIG. 1. As shown in FIG. 4, the main frame 310 configures the predetermined number of light guide portions 315 at each of right and left sides of a peripheral area of the opening 314.

As shown in FIG. 2 and FIG. 4, the diffuser plate 311 as a diffuser member is made of a light transmissive resin such as polycarbonate resin and is configured to be an approximately rectangular flat-plate shape when seen from an anterior view. The diffuser plates 311 are attached to the main frame 310, and are provided at each of the right and left sides of the peripheral area of the opening 314. As shown in FIG. 3 and FIG. 4, each of the diffuser plates 311 covers a light guiding side of the corresponding light guide portions 315 at the both sides of the opening 314. For example, the thickness of the diffuser plates 311 is approximately 10 mm. Thereby, the respective diffuser plates 311 diffuse the incident light from the corresponding light guide portions 315 toward an opposite side of the corresponding light guide portions 315.

Figure 5:
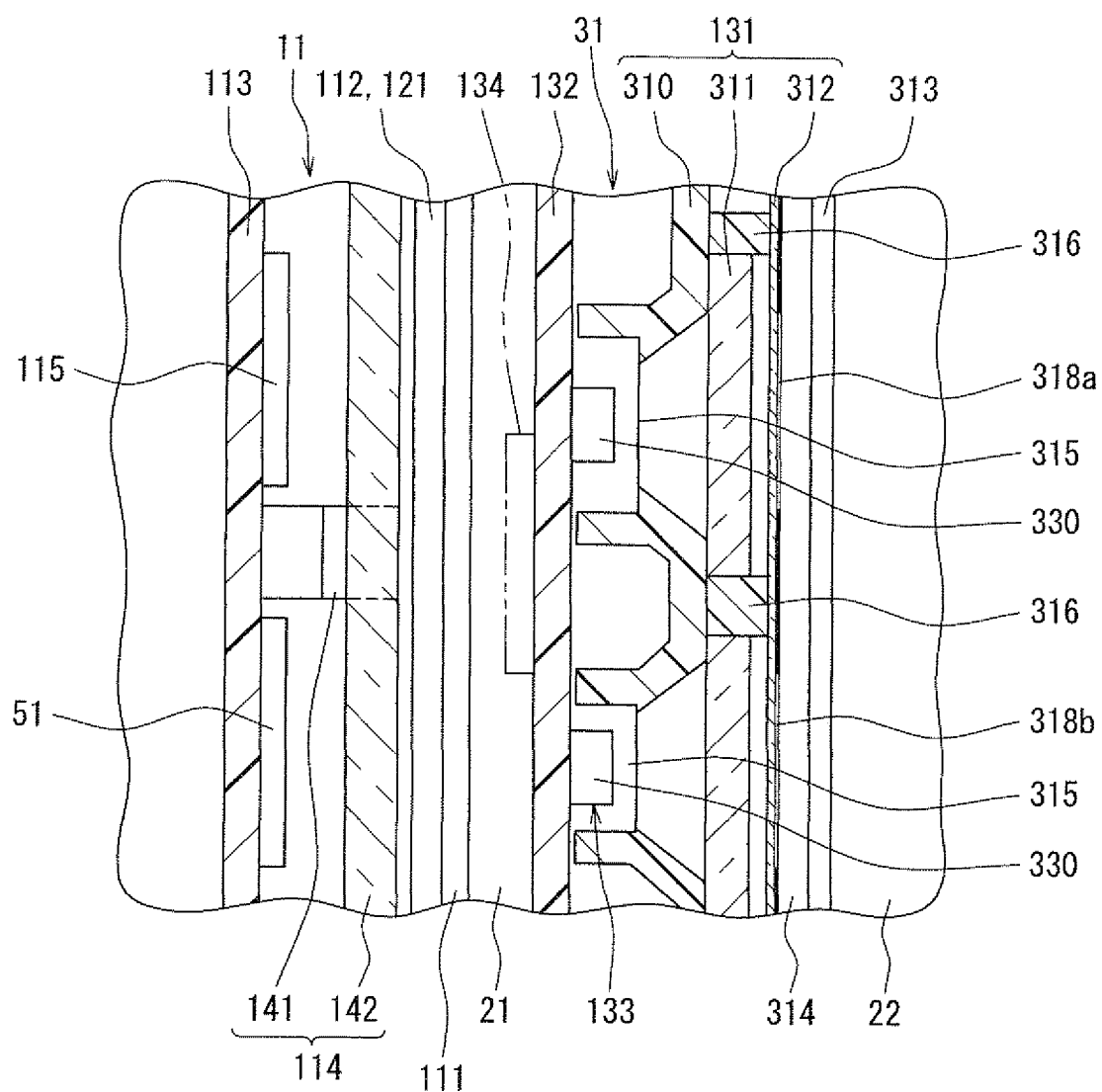
FIG. 5 is a cross-sectional view showing a modified example of FIG. 4.

Two-color molding is performed with the use of black ABS resin so that a light shielding wall 316 is formed at a portion except the light guiding side of the corresponding light guide portions 315 and an outer edge portion of the light guide portions 315 in the respective diffuser plates 311. The light shielding wall 316 prevents the incident light on each of the light guide portions 315 from leaking to the light guiding side of the other light guide portion 315. As shown by a modified example in FIG. 5, the light shielding wall 316 may be integrally formed with the display panel 312 (described below)

by the two-color molding, and the diffuser plate 311 may be fixed to the light shielding wall 316.

The display panel 312 shown in FIG. 1, FIG. 2 and FIG. 4 is formed by laminating at least a light shielding print layer on a base material made of a light transmissive resin such as a polycarbonate resin, and is configured to be a flat-plate shape. The display panel 312 is located so as to be approximately parallel to the screen 121 of the image display monitor 112, and is attached to the main frame 310 at a light diffusing side of the respective diffuser plates 311 (refer to FIG. 2). The display panel 312 is configured to be a frame structure that is an approximately inverted U-shape when seen from an anterior view, and defines the opening 314 together with the main frame 310. A decorating ring 313 is integrally formed with the display panel 312 by the two-color molding with the use of the ABS resin or the like. The decorating ring 313 further defines the opening 314 at the display side of the image display monitor 112 so that a display region of the speed meter 122a, a display region of the fuel meter 122b and a display region of the temperature meter 122c are divided at the screen 121.

As shown in FIG. 1, the display panel 312 covers the respective diffuser plates 311 from the light diffusing side at the peripheral area of the opening 314. The display panel 312 forms abnormal indicators 318 for indicating abnormal condition of the vehicle and operation indicators 319 for indicating operation condition of the vehicle. Vehicle condition, e.g., the abnormal condition and the operation condition, is a state that is displayed by the indicators 318 and 319, and the vehicle condition is also referred to as "a vehicle second state".

The abnormal indicators 318 are provided at portions corresponding to the respective light guide portions 315 at the left of the opening 314 via through-holes penetrating the light shielding print layer. The abnormal indicators 318 includes a seatbelt indicator 318a for indicating abnormality in a seatbelt of the vehicle, a battery indicator 318b for indicating abnormality in a battery of the vehicle and a tire inflation pressure indicator 318c for indicating abnormality in a tire inflation pressure of the vehicle. Specifically, the seatbelt indicator 318a is displayed by light when a driver does not wear the seatbelt of the vehicle, and the seatbelt indicator 318a is turned off to become a seemingly nondisplayed state when the driver wears the seatbelt. The battery indicator 318b is displayed by light when a battery voltage of the vehicle is lower than a set voltage, and the battery indicator 318b is turned off to become a seemingly nondisplayed state when the battery voltage is equal to or higher than the set voltage. The tire inflation pressure indicator 318c is displayed by light when the tire inflation pressure of the vehicle is lower than a set pressure, and the tire inflation pressure indicator 318c is turned off to become a seemingly nondisplayed state when the tire inflation pressure is equal to or higher than the set pressure.

The operation indicators 319 are provided at portions corresponding to the respective light guide portions 315 at the right of the opening 314 via through-holes penetrating the light shielding print layer. The operation indicators 319 includes an ACC indicator 319a for indicating operation condition of an ACC (Active Cruise Control) system of the vehicle, an LKA indicator 319b for indicating operation condition of an LKA (Lane Keeping Assist) system of the vehicle and an AFS indicator 319c for indicating operation condition of an AFS (Adaptive Front Lighting System) of the vehicle. Specifically, the ACC indicator 319a is displayed by light during the operational state of the ACC system that controls the owned vehicle so as to follow a vehicle running in front of the owned vehicle, and the ACC indicator 319a is turned off to become a seemingly nondisplayed state during the non-operational state of the ACC system. The LKA indicator 319b is displayed by light during the operational state of the LKA system that controls the vehicle so as to keep running in a driving lane, and the LKA indicator 319b is turned off to become a seemingly nondisplayed state during the non-operational state of the LKA system. The AFS indicator 319c is displayed by light during the non-operational state of the AFS that variably controls an irradiation direction of the headlight in accordance with a steering direction of the vehicle, and the AFS indicator 319c is turned off to become a seemingly nondisplayed state during the operational state of the AFS.

As shown in FIG. 2 and FIG. 4, the indicator substrate 132 is held in the facing plate 21 behind the display pane 131 and at the display side of the image display monitor 112. The indicator substrate 132 is a hard substrate made of glass epoxy or the like and is configured to be a frame structure that is an approximately inverted U-shape when seen from an anterior view. The indicator substrate 132 defines the opening 314 with the main frame 310 and the display panel 312.

The indicator light source 133 includes plural light emitting diodes 330 corresponding to the respective indicators 318, 319 via the respective light guide portions 315. The light emitting diodes 330 are chip-type light emitting diodes and are mounted on the indicator substrate 132 behind the corresponding light guide portions 315 as shown in FIG. 4. Each of the light emitting diodes 330 is driven by energization to emit light so that a predetermined color light is emitted toward the corresponding light guide portion 315. Thus, incident light on the light guide portion 315 from each of the light emitting diodes 330 is diffused toward the display panel 312 by the diffuser plate 311, and the corresponding indicators 318, 319 are lighted by light-transmission to be displayed by light.

In the present embodiment, the light emitting diodes 330 for lighting the seatbelt indicator 318a and the battery indicator 318b emit red light. In the present embodiment, the light emitting diodes 330 for lighting the tire inflation pressure indicator 318c and the AFS indicator 319c emit yellow light. In the present embodiment, the light emitting diodes 330 for lighting the ACC indicator 319a and the LKA indicator 319b emit green light.

The indicator driver 134 is mainly configured by an electric circuit. The indicator driver 134 is mounted on the indicator substrate 132 and is electrically connected to the light emitting diodes 330 of the indicator light source 133 as shown in FIG. 3. The indicator driver 134 drives the light emitting diodes 330 by energization in accordance with an indicator control signal so that luminance of the light emitting diodes 330 are adjusted.

The dimmer switch 41 is configured to be able to variably operate for adjusting display luminance, and is provided in the vicinity of the driver seat of the vehicle. The dimmer switch 41 of the present embodiment is a switch for gradually or continuously adjusting the display luminance of the meters 122 at the screen 121 of the image display monitor 112. Thus, the driver can input an adjustment value relating to the display luminance of the meters 122 by adjusting the operational position of the dimmer switch 41. The dimmer switch 41 generates and outputs a dimming signal to represent the adjustment value input by the driver.

The control unit 51 is mainly configured by a microcomputer. In the present embodiment, the control unit 51 is mounted on the monitor substrate 113 in the monitor chassis 111 of the meter unit 11 as shown in FIG. 4. The control unit 51 includes an image memory 56. Image data relating to an image display of the meters 122 is stored in advance in the image memory 56. The control unit 51 is electrically connected to the image display monitor 112 and the monitor light source driver 115 of the meter unit 11, the indicator driver 134 of the indicator unit 31 and the dimmer switch 41. Furthermore, the control unit 51 is electrically connected to a light control switch 52 and sensor portions 53, 54, 55 of the vehicle.

The light control switch 52 is configured to be able to variably operate for turning on/off lights of the vehicle, and is provided in the vicinity of the driver seat of the vehicle. The driver can input at least one of an instruction to turn on a small light, an instruction to turn on a headlight and an instruction to turn off all lights by adjusting the operational position of the light control switch 52. The light control switch 52 generates and outputs a turning on/off signal to represent the instruction input by the driver.

A state value sensor portion 53 detects the value of the vehicle state, that is, the vehicle speed, the remaining fuel level and the coolant temperature, which are objects to be instructed by the meters 122. A condition sensor portion 54 detects the vehicle condition, that is, the abnormality in the seatbelt, the abnormality in the battery, the abnormality in the tire inflation pressure, the operation condition of the ACC system, the operation condition of the LKA system and the operation condition of the AFS, which are objects to be indicated by the indicators 318, 319. An illuminance sensor portion 55 is formed by a phototransistor, a photodiode or the like, and detects illuminance of light outside the vehicle. The sensor portions 53, 54, 55 generate and output detection signals that represent detection results of the respective objections.

The control unit 51 generates the monitor control signal and the light source control signal based on the image data stored in the image memory 56, the dimming signal output from the dimmer switch 41, the detection signals output from the sensor portions 53, 55 and the like. The monitor control signal is output to the image display monitor 112 of the meter unit 11 so that the liquid-crystal pixels of the screen 121 are driven and the meters 122 are displayed by an image. The light source control signal is output to the monitor light source driver 115 of the meter unit 11 so that the light emitting diode 141 of the monitor light source 114 is driven to emit light and the screen 121 lights up. Therefore, in the present embodiment, the control unit 51 generates the monitor control signal and the light source control signal, and the monitor control signal and the light source control signal are output to the image display monitor 112 and the monitor light source driver 115 so that the display luminance of the meters 122 depending on the value of the gray level of pixels in the respective meters 122 and the luminance of the light emitting diode 141 is controlled with a high degree of accuracy. Hereinafter, "the control unit 51 generates the monitor control signal and the light source control signal, and the monitor control signal and the light source control signal are output to the image display monitor 112 and the monitor light source driver 115" is explained as "the control unit 51 controls the display luminance of the meters 122".

The control unit 51 generates the indicator control signal based on the turning on/off signal output from the light control switch 52 and the detection signal output from the condition sensor portion 54. The indicator control signal is output to the indicator driver 134 of the indicator unit 31 so that the light emitting diodes 330 of the indicator light source 133 are driven to emit light and the indicators 318, 319 light up. Therefore, in the present embodiment, the control unit 51 generates the indicator control signal and the indicator control signal is output to the indicator driver 134 so that the display luminance of the indicators 318, 319 depending on the luminance of the light emitting diodes 330 is controlled with a high degree of accuracy. Hereinafter, "the control unit 51 generates the indicator control signal and the indicator control signal is output to the indicator driver 134" is explained as "the control unit 51 controls the display luminance of the indicators 318, 319".

Hereinafter, a display luminance control of the meters 122 will be described in detail.

Figure 6:
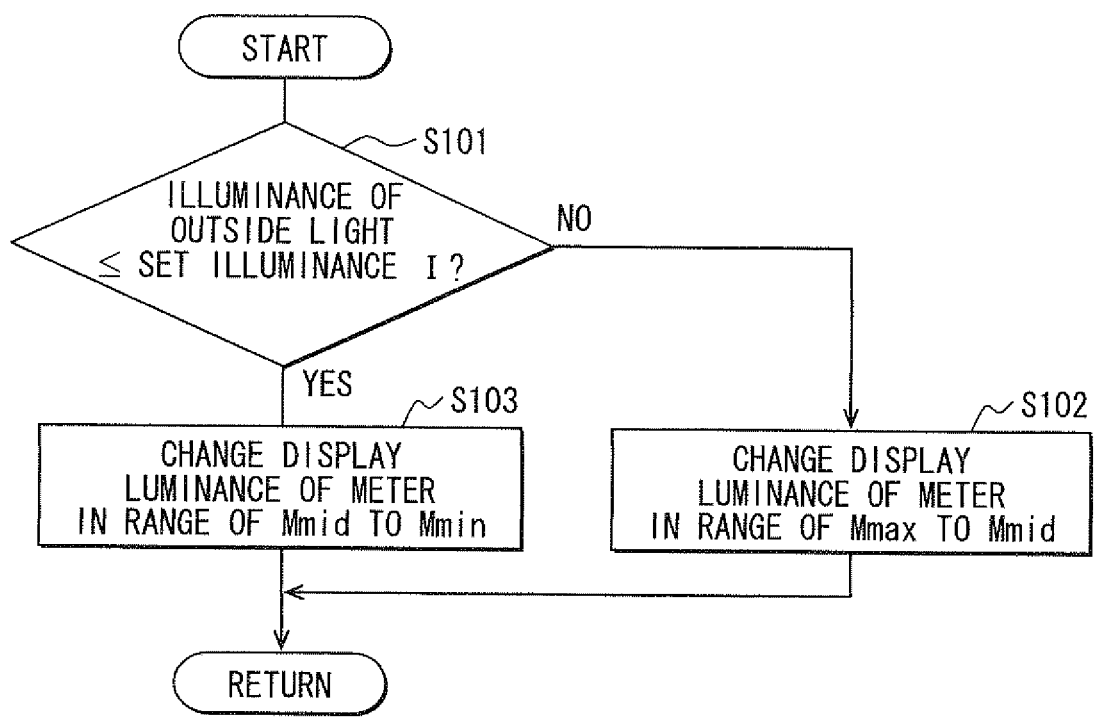
FIG. 6 is a flow diagram showing a display luminance control of a meter according to the first embodiment of the present invention.

The control unit 51 controls the display luminance of the meters 122 by operating a meter control program. Specifically, as shown in S101 of FIG. 6, the control unit 51 determines whether illuminance of light outside the vehicle (outside light) is equal to or lower than set illuminance I based on the signal output from the illuminance sensor portion 55.

Figure 7:
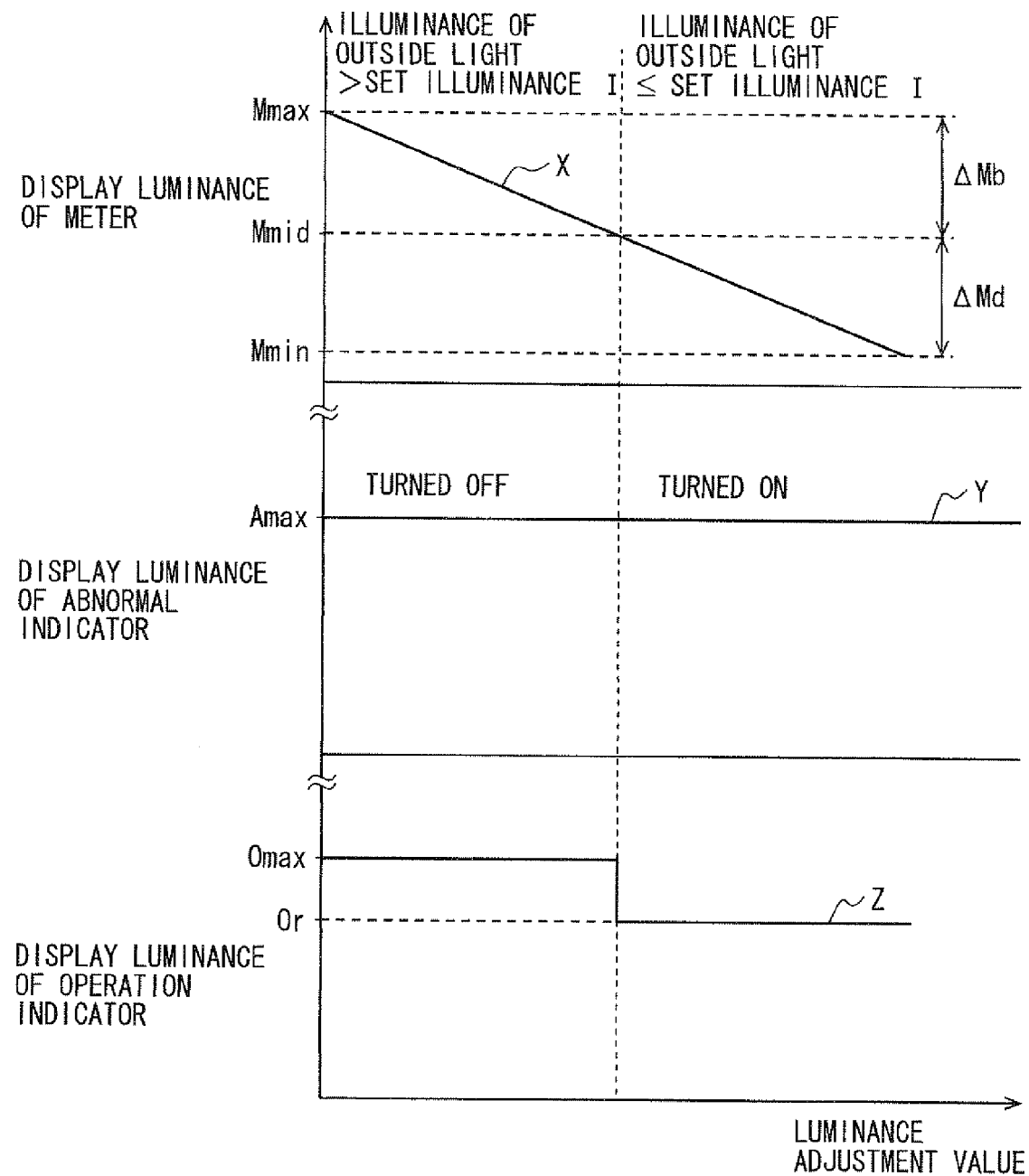
FIG. 7 is a graph showing a display luminance adjustment according to the first embodiment of the present invention.

When the illuminance of the outside light exceeds the set illuminance I (e.g., during daytime), corresponding to "NO" at S101, S102 is performed. At S102 in FIG. 6, the control unit 51 changes the display luminance of the meters 122 depending on an adjustment value of the display luminance represented by the signal from the dimmer switch 41 in a range ΔMb from maximum luminance Mmax to medium luminance Mmid shown in the graph X in FIG. 7. Hereinafter, the adjustment value of the display luminance is referred to as a luminance adjustment value. Here, when the maximum luminance Mmax is estimated to be 100%, 50% luminance is used as the medium luminance Mmid, for example.

In contrast, when the illuminance of the outside light is equal to or lower than the set illuminance I (e.g., during nighttime or when the vehicle runs in a dark place), corresponding to "YES" at S101, S103 is performed. At S103 in FIG. 6, the control unit 51 changes the display luminance of the meters 122 depending on the luminance adjustment value in a range ΔMd from the medium luminance Mmid to minimum luminance Mmin shown in the graph X in FIG. 7. Here, when the medium luminance Mmid is estimated to be 50%, 1% luminance is used as the minimum luminance Mmin, for example.

In the display luminance control, when the illuminance of the outside light exceeding the set illuminance I becomes equal to or lower than the set illuminance I, the control unit 51 decreases the display luminance of the meters 122 to the medium luminance Mmid. In contrast, when the illuminance of the outside light equal to or lower than the set illuminance I exceeds the set illuminance I, the control unit 51 increases the display luminance of the meters 122 to the maximum luminance Mmax.

Figure 8:
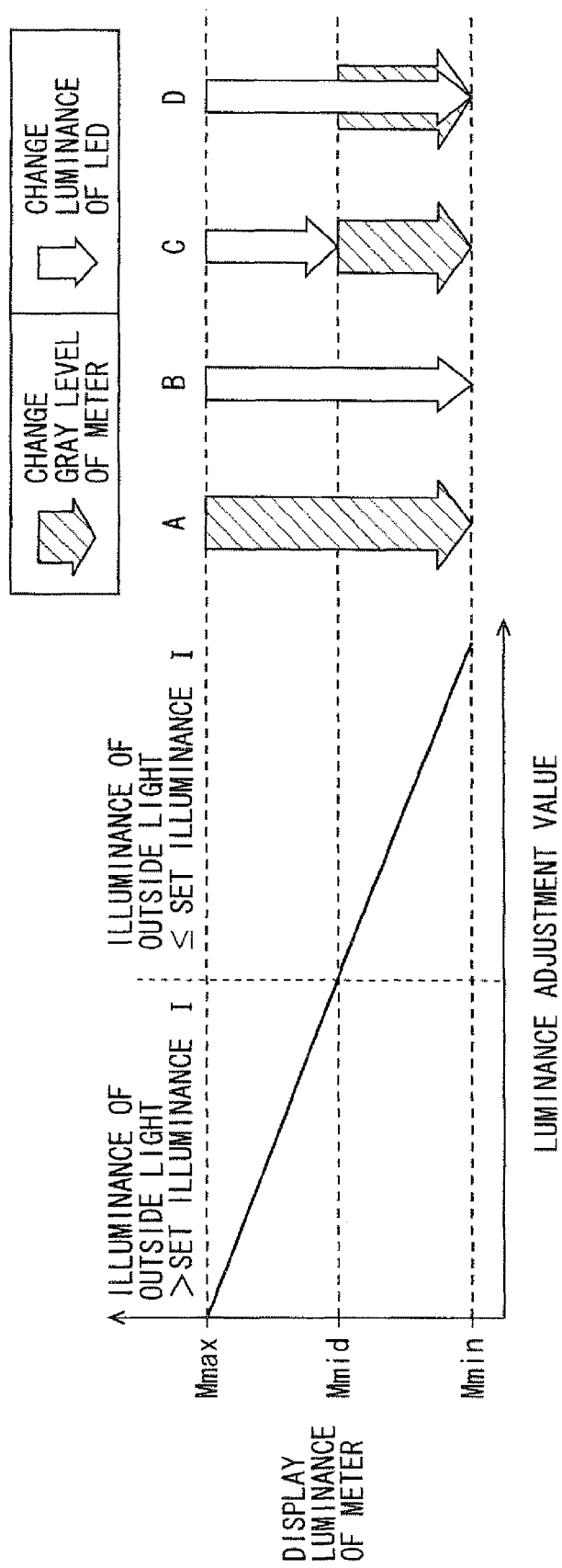
FIG. 8 is a graph showing a method for performing the display luminance control of the meter according to the first embodiment of the present invention.

In the display luminance control, as shown in FIG. 8, at least one of the value of the gray level of pixels in the meters 122 and the luminance of the light emitting diode 141 may be changed in order to operate the variable control of the display luminance depending on the illuminance of the outside light. Specifically, as shown by the arrow A in FIG. 8, when the illuminance of the outside light exceeds the set illuminance I and when the illuminance of the outside light is equal to or lower than the set illuminance I, the value of the gray level of pixels in the meters 122 is changed while the luminance of the light emitting diode 141 is kept. As shown by the arrow B in FIG. 8, when the illuminance of the outside light exceeds the set illuminance I and when the illuminance of the outside light is equal to or lower than the set illuminance I, the luminance of the light emitting diode 141 is changed while the value of the gray level of pixels in the meters 122 is kept. As shown by the arrow C in FIG. 8, when the illuminance of the outside light exceeds the set illuminance I, the value of the gray level of pixels in the meters 122 is kept and the luminance of the light emitting diode 141 is changed. When the illuminance of the outside light is equal to or lower than the set illuminance I, the luminance of the light emitting diode 141 is kept and the value of the gray level of pixels in the meters 122 is changed. As shown in the arrow D in FIG. 8, when the illuminance of the outside light exceeds the set illuminance I, the value of the gray level of pixels in the meters 122 is kept and the luminance of the light emitting diode 141 is changed. When the illuminance of the outside light is equal to or lower than the set illuminance I, both the value of the gray level of pixels in the meters 122 and the luminance of the light emitting diode 141 are changed.

Hereinafter, a display luminance control of the indicators 318, 319 will be described in detail.

The control unit 51 controls the display luminance of the abnormal indicators 318 and the operation indicators 319 during the indicators 318, 319 light up by operating an indicator control program. Specifically, at S201 in FIG. 9, the control unit 51 determines whether the lights of the vehicle are turned on/off based on the signal output from the light control switch 52.

Figure 9:
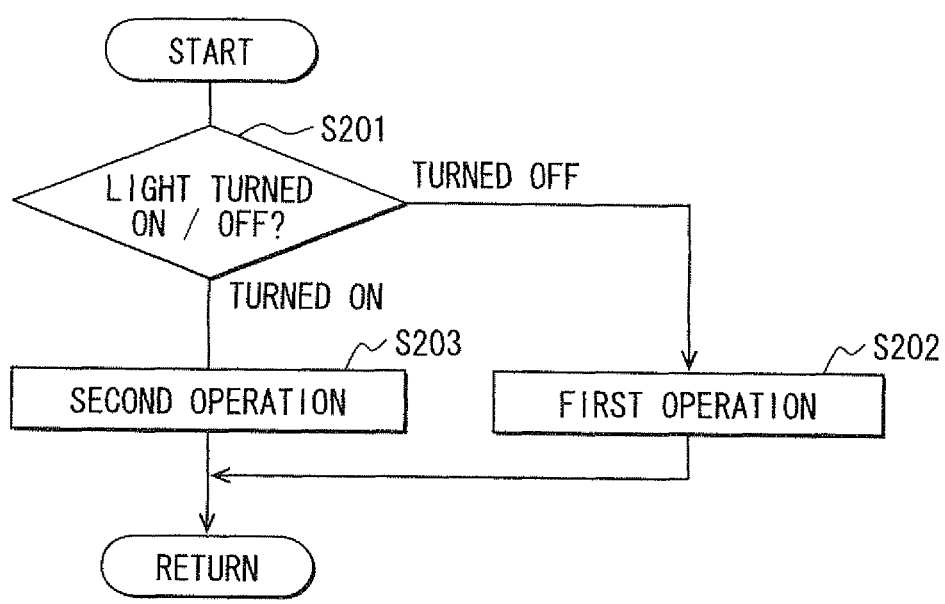
FIG. 9 is a flow diagram showing a display luminance control of an indicator according to the first embodiment of the present invention.

When all of the lights are determined to be turned off (e.g., during daytime), a first operation is performed at S202 in FIG. 9. In the first operation, the control unit 51 keeps the display luminance of the abnormal indicators 318 and the operation indicators 319 during the indicators 318, 319 light up to constant maximum luminance Amax, Omax regardless of the luminance adjustment value, as shown by the graphs Y and Z in FIG. 7.

In contrast, when the small light or the headlight is determined to be turned on (e.g., during nighttime or when the vehicle runs in a dark place), a second operation is performed at S203 in FIG. 9. In the second operation, the control unit 51 keeps the display luminance of the abnormal indicators 318 during the indicators 318 light up to the maximum luminance Amax regardless of the luminance adjustment value, as shown by the graph Y in FIG. 7. At the same time, the control unit 51 decreases the display luminance of the operation indicators 319 during the indicators 319 light up to an extinction luminance Or and keeps to the extinction luminance Or regardless of the luminance adjustment value, as shown by the graph Z in FIG. 7. It is preferable that the extinction luminance Or of the operation indicators 319 has luminance that does not impair visibility, which is necessary to accomplish the indication of the operational state. For example, when the maximum luminance Omax is estimated to be 100%, 15% luminance is used as the extinction luminance Or, for example.

According to the first embodiment of the present invention, the display luminance of the meters 122 displayed by the image display monitor 112 of the meter unit 11 and the display luminance of the indicators 318, 319 formed at the display pane 131 of the indicator unit 31 are independently controlled. Thus, regarding the meters 122, the anti-glare property, to which the driver prefers, can be obtained by the display luminance control in accordance with the luminance adjustment value. Regarding the indicators 318, 319, the visibility can be secured by the display luminance control which is not based on the luminance adjustment value. Moreover, the indicators 318, 319 are formed around the opening 314, through which the meters 122 are exposed at the display side of the image display monitor 112. Because a visual distance between the indicators 318, 319 and the driver is shorter than a visual distance between the meters 122 and the driver, the visibility of the indicators 318, 319 can be improved. Therefore, the display device of the present embodiment can accomplish both indicating the value of the vehicle state by the meters 122, which is achieved by the anti-glare property, and indicating the vehicle condition by the indicators 318, 319, which is achieved by securing the visibility.

In the first embodiment, regarding the meters 122 which are always displayed large in a wide range of the window portion 22, when the condition of the outside light illuminance, in which the illuminance of the outside light of the vehicle decreases equal to or lower than the set illuminance I, is satisfied, the display luminance is decreased automatically to the medium luminance Mmid. Thereby, the burden for the driver to operate the display luminance adjustment of the meters 122 in order to obtain the anti-glare property in accordance with the illuminance of the outside light equal to or lower than the set illuminance I can be reduced.

In the first embodiment, when the condition of the outside light illuminance, in which the small light or the headlight is turned on in accordance with the change of the illuminance of the outside light, is satisfied, the display luminance of the operation indicators 319 during the indicators 319 light up is decreased automatically to the extinction luminance Or that can secure the visibility. Thereby, regarding the operation indicators 319, which are displayed relatively small in the window portion 22, for indicating the operation condition having low degree of urgency, glare can be reduced while the necessary visibility is secured.

Furthermore, in the first embodiment, when the condition of the outside light illuminance, in which the illuminance of the outside light decreases equal to or lower than the set illuminance I, is satisfied, and when the condition of the outside light illuminance, in which the small light or the headlight is turned on, is satisfied, the display luminance of the abnormal indicators 318 during the indicators 318 light up can be kept. Thus, the indicators 318 are displayed relatively small in the window portion 22, and furthermore, regarding the abnormal indicators 318 which are displayed only when the abnormality having high degree of urgency occurs, the high visibility can be obtained by keeping the display luminance when the abnormality occurs.

Regarding the indicator unit 31, in the case where the length of a light guide pathway is secured such that uneven illumination of the respective indicators 318, 319 can be suppressed between the respective light emitting diodes 330 of the indicator light source 133 and the display panel 312 of the display pane 131, the indicator unit 31 may become too large in the display direction. When the indicator unit 31 becomes too large at the display side of the image display monitor 112, the visibility of the meters 122 exposed through the opening 314 at the display side may be impaired, or the visual quality of the whole display device 1 may be worsened. However, in the indicator unit 31, in which the diffuser plate 311 is provided between the respective light emitting diodes 330 and the display panel 312, of the first embodiment, emitted light from the light emitting diodes 330 is diffused and the indicators 318, 319 of the display panel 312 can be illuminated approximately uniformly. Thereby, the length of the light guide pathway that needs to be secured between the light emitting diodes 330 and the display panel 312 can be shortened in the display direction of the indicator unit 31. Therefore, by flattening the indicator unit 31 in the display direction, the visibility of the meters 122 can be secured and the visual quality of the whole display device 1 can be increased.

Second Embodiment

Figure 10:
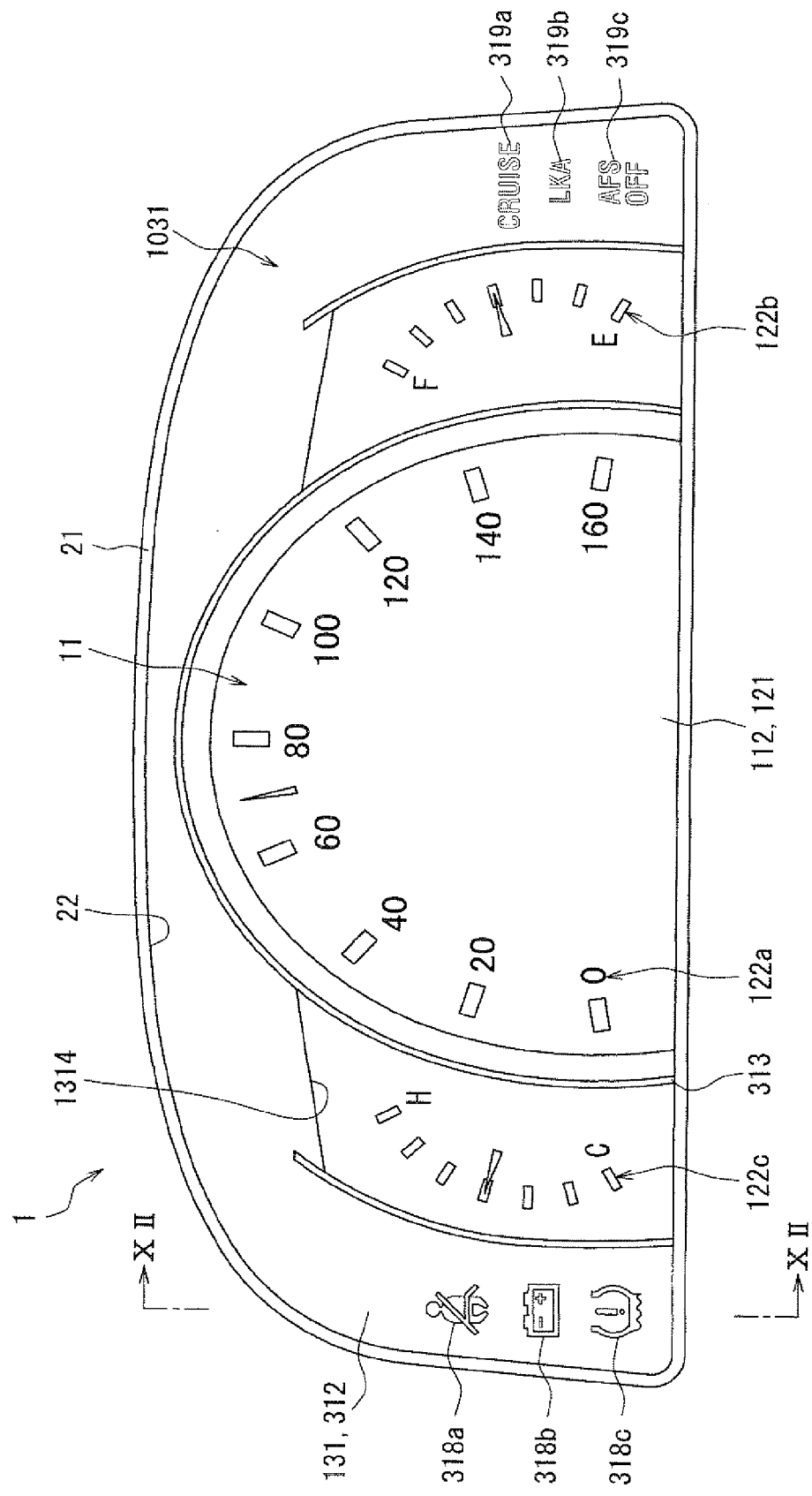
FIG. 10 is a front view showing a schematic configuration of a display device for a vehicle according to a second embodiment of the present invention.
Figure 11:
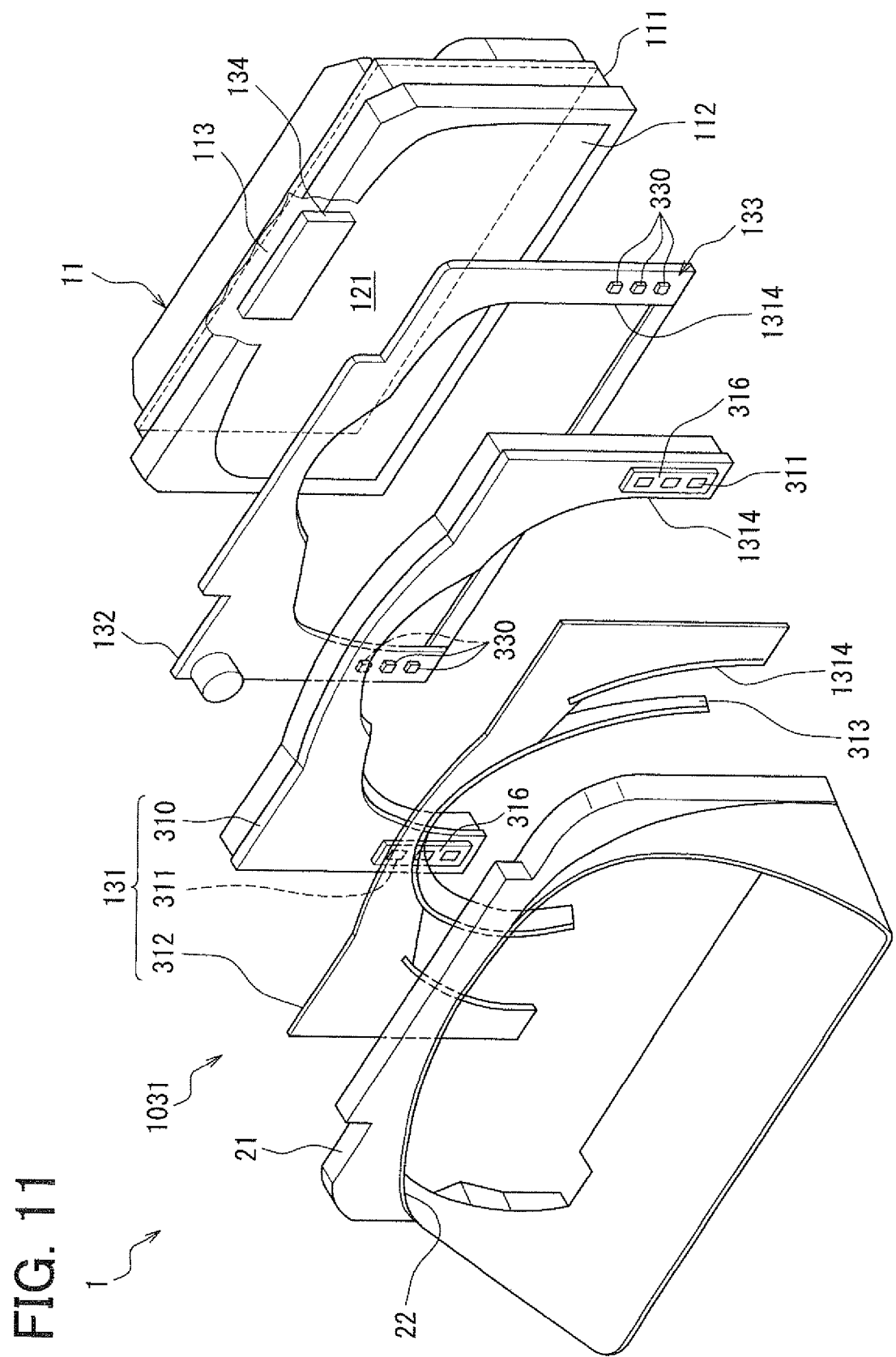
FIG. 11 is an exploded perspective view showing the schematic configuration of the display device for a vehicle according to the second embodiment of the present invention.
Figure 12:
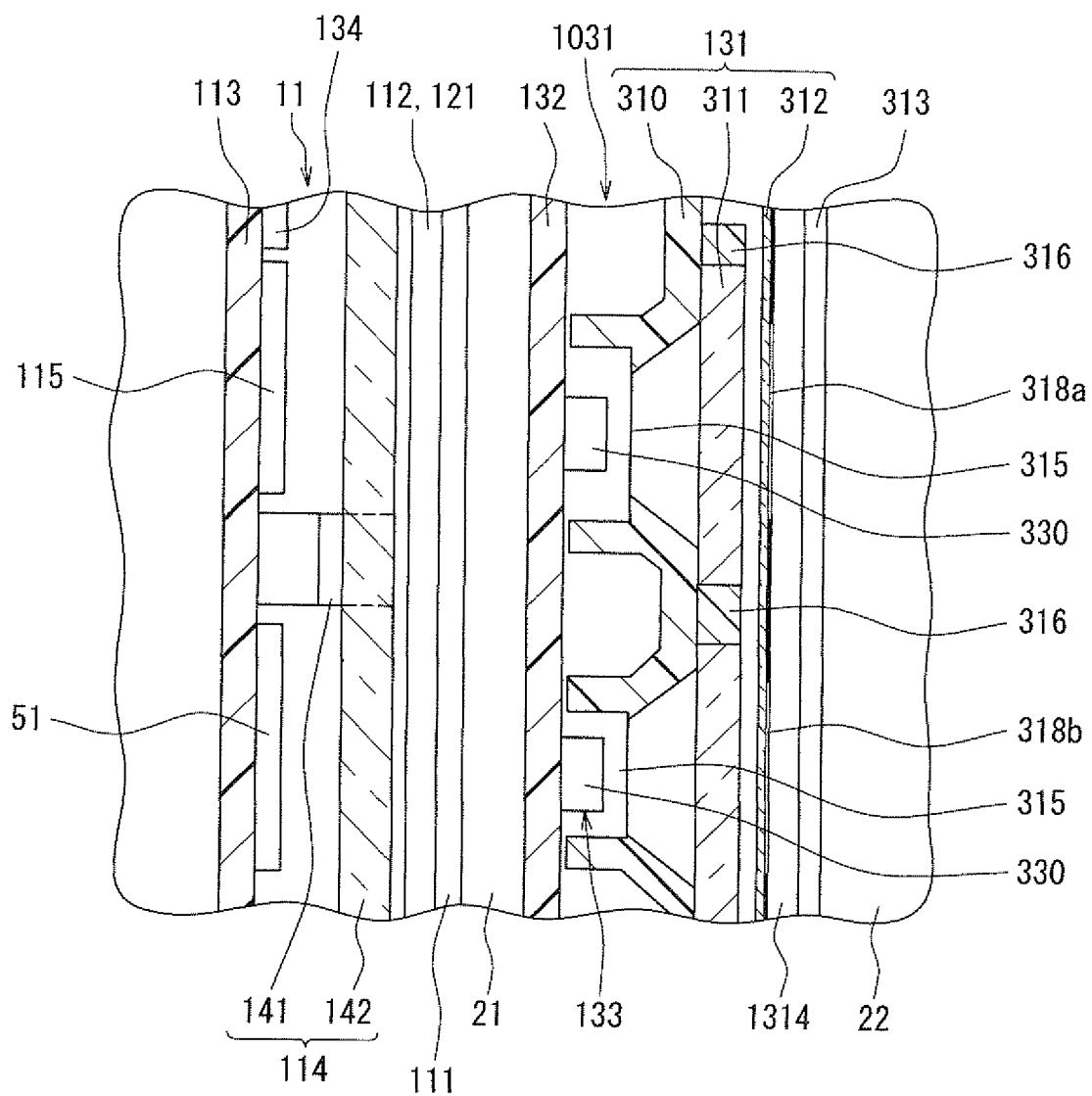
FIG. 12 is a cross-sectional view taken along line XII-XII in FIG. 10.

A second embodiment of the present invention will be described with reference to FIG. 10 to FIG. 12. The second embodiment is a modified example of the first embodiment. In an indicator unit 1031 of the second embodiment shown in FIG. 11 and FIG. 12, the indicator driver 134 is mounted on the monitor substrate 113 in the monitor chassis 111 of the meter unit 11 together with the control unit 51 instead of being mounted on the indicator substrate 132. Thereby, the indicator driver 134, which is directly electrically-connected to the control unit 51 by an electrical wiring on the monitor substrate 113, is electrically connected to the light emitting diodes 330 of the indicator light source 133 mounted on the indicator substrate 132 via a flexible printed substrate (not shown in the drawing).

According to the above-described configuration, components other than the light emitting diodes 330 of the indicator light source 133 that are needed to illuminate the indicators 318, 319 of the display pane 131 (the display panel 312) from behind are not mounted on the indicator substrate 132. Therefore, as shown in FIG. 10 and FIG. 11, an opening 1314 defined by the indicator substrate 132 together with the display pane 131 (the main frame 310 and the display panel 312) at the display side of the image display monitor 112 can be formed as large as possible. By using such a large opening 1314, a region, which does not display the meters 122 covered by the indicator substrate 132 and the display pane 131 at the display side, of the screen 121 of the image display monitor 112 can be reduced in size. In other words, an exposed region by the opening 1314 of the meters 122 displayed on the screen 121 is enlarged as shown in FIG. 10 and FIG. 11, and the visibility of the meters 122 can be improved.

Other Embodiments

An external image that is obtained by taking an image of the outside of the vehicle with a visible camera, a night-vision camera or the like may be displayed on the screen 121 of the image display monitor 112 instead of displaying the meters 122 indicating the value of the vehicle state. Furthermore, the meters 122 may be used for indicating the value of the vehicle state such as an engine rotation speed instead of indicating the vehicle speed, the remaining fuel level and the temperature of the coolant.

The abnormal indicators 318 may be used for indicating abnormal condition of the vehicle such as abnormality in the operation of an air-bag system, abnormality in a shortage of engine-oil, abnormality in a shortage of fuel and abnormality in the increase of a temperature of the coolant instead of indicating the abnormality in the seatbelt, the abnormality in the battery and the abnormality in the tire inflation pressure. In addition, the operation indicators 319 may be used for indicating operation condition of the vehicle such as condition of turning on/off of the headlight of the vehicle instead of indicating the operation condition of the ACC system, the operation condition of the LKA system and the operation condition of the AFS.

When the condition of the outside light illuminance, in which the small light or the headlight is turned on in accordance with the change of the illuminance of the outside light, is satisfied, the display luminance of the meters 122 may be decreased to the medium luminance Mmid. When the condition of the outside light illuminance, in which the illuminance of the outside light of the vehicle decreases equal to or lower than the set illuminance I, is satisfied, the display luminance of the operation indicators 319 may be decreased to the extinction luminance Or. Alternatively, regardless of the condition of the outside light illuminance in which the small light or the headlight is turned on and the condition of the outside light illuminance in which the illuminance of the outside light decreases equal to or lower than the set illuminance I, the display luminance of the operation indicators 319 may be kept at the maximum luminance Omax.

The indicator substrate 132 may be divided into right and left, for example, regardless of with or without mounting the indicator driver 134.

With respect to the image display monitor 112, for example, a reflective liquid-crystal display monitor or an electroluminescence display monitor may be used in place of the transmissive liquid-crystal display monitor. Moreover, the present invention can be applied to a display device for a vehicle such as a head up display, which displays a virtual image of a display image of the image display monitor on a combiner, other than the display device 1 functioning as a combination meter.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display device for a vehicle comprising:
a meter unit including an image display monitor having a screen, and displaying an image of a meter on the screen, the meter indicating a vehicle state value;
an indicator unit including a display pane, which defines an exposure opening for exposing the meter at a display side of the image display monitor, and provides an indicator on both sides of a peripheral area of the display pane across the exposure opening, the indicator unit displaying the indicator for indicating another vehicle state by light; and
a control unit configured to control independently a display luminance of the meter and a display luminance of the indicator, wherein:
the meter unit further includes a monitor substrate, on which the control unit is mounted;
the indicator unit further includes:
an indicator substrate defining the exposure opening together with the display pane at the display side of the image display monitor;
an indicator light source mounted on the indicator substrate and illuminating the indicator on the display pane from behind so that the indicator is displayed by light; and
an indicator driver mounted on the monitor substrate, electrically connected to the control unit, and adjusting a luminance of the indicator light source in accordance with an indicator control signal output from the control unit, which controls the display luminance of the indicator according to the luminance of the indicator light source;
the image of the meter includes a pointer image and a speed meter image;
the indicator substrate is sandwiched between the display pane and the screen of the meter unit, and the indicator substrate is behind the display pane and in front of the meter unit so that indicator substrate is at the display side of the image display monitor of the meter unit;
the indicator light source is disposed on both sides of the peripheral area of the indicator substrate across the exposure opening in the indicator substrate; and
the indicator includes an abnormal indicator for indicating an abnormal condition of the vehicle.

2. The display device for the vehicle according to claim 1, wherein:
the control unit changes the display luminance of the meter in accordance with an adjustment value input into the vehicle and keeps the display luminance of a predetermined element of the indicator regardless of the adjustment value.

3. The display device for the vehicle according to claim 1, wherein:
the display pane provides the abnormal indicator as the indicator for indicating the abnormal condition of the vehicle; and
the control unit changes the display luminance of the meter depending on a condition of an outside light illuminance relating to a change of the outside light illuminance of the vehicle, and keeps the display luminance of the abnormal indicator regardless of the condition of the outside light illuminance.

4. The display device for the vehicle according to claim 1, wherein:
the display pane provides the abnormal indicator as the indicator for indicating the abnormal condition of the vehicle and an operation indicator as the indicator for indicating an operation condition of the vehicle; and
the control unit keeps the display luminance of the abnormal indicator regardless of a condition of an outside light illuminance relating to a change of the outside light illuminance of the vehicle, and changes the display luminance of the operation indicator depending on the condition of the outside light illuminance.

5. The display device for the vehicle according to claim 1, wherein:
the meter unit further includes:
a liquid crystal display monitor as the image display monitor for displaying the image of the meter by using a liquid-crystal pixel configuring the screen; and
a monitor light source for emitting light and illuminating the screen of the liquid-crystal display monitor; and
the control unit controls the display luminance of the meter depending on a value of a gray level of the liquid-crystal pixel and a luminance of the monitor light source.

6. The display device for the vehicle according to claim 1, wherein:
the indicator unit further arranged at the display side of the image display monitor includes a diffuser member, which diffuses light emitted from the indicator light source to inject the light into the indicator of the display pane.

7. A display device for a vehicle comprising:
a meter unit including an image display monitor having a screen, and displaying an image of a meter on the screen, the meter indicating a vehicle state value;
an indicator unit including a display pane, which defines an exposure opening for exposing the meter at a display side of the image display monitor, and provides an indicator on both sides of a peripheral area of the display pane across the exposure opening, the indicator unit displaying the indicator for indicating another vehicle state by light; and
a control unit configured to control independently a display luminance of the meter and a display luminance of the indicator, wherein:
the meter unit further includes a monitor substrate, on which the control unit is mounted;
the indicator unit further includes:
an indicator substrate defining the exposure opening together with the display pane at the display side of the image display monitor;
an indicator light source mounted on the indicator substrate and illuminating the indicator on the display pane from behind so that the indicator is displayed by light; and
an indicator driver mounted on the monitor substrate, electrically connected to the control unit, and adjusting a luminance of the indicator light source in accordance with an indicator control signal output from the control unit, which controls the display luminance of the indicator according to the luminance of the indicator light source;
the image of the meter includes a pointer image and a speed meter mage;
the indicator substrate is sandwiched between the display pane and the screen of the meter unit so that the indicator substrate is behind the display pane, the display pane is positioned on a viewer side of the indicator substrate and the meter unit is positioned on a non-viewer side of the indicator substrate;
the indicator light source is disposed on both sides of the peripheral area of the indicator substrate across the exposure opening in the indicator substrate; and
the indicator includes an abnormal indicator for indicating an abnormal condition of the vehicle.

* * * * *